Figure 1:
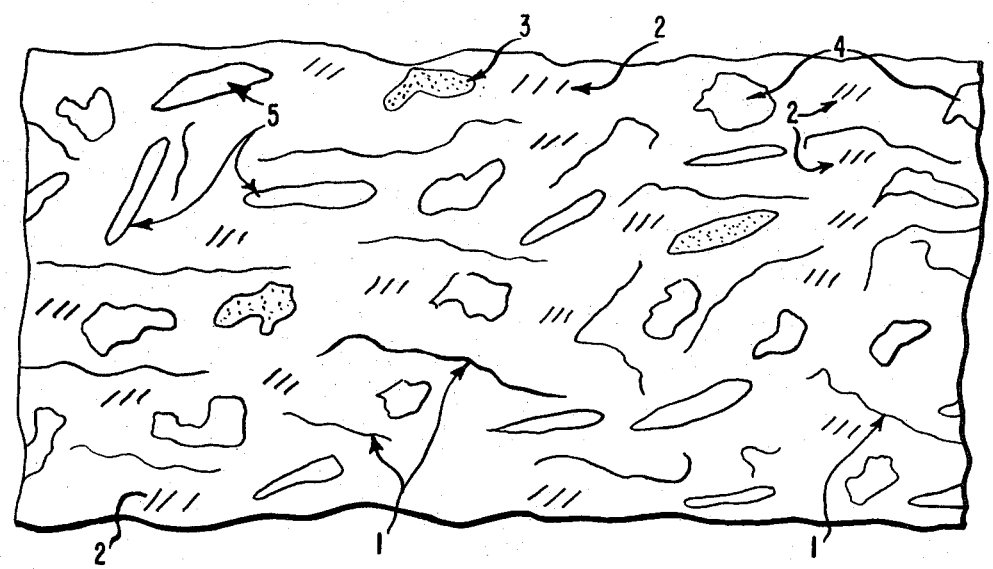

United States Patent
Stiles et al.

[15] 3,691,097
[45] Sept. 12, 1972

[54] UNIFORM COMPOSITE STRUCTURES OF CATALYST AND FIBROUS REFRACTORY

[72] Inventors: Alvin B. Stiles, 1301 Grayson Rd., Welshire, Wilmington, Del. 19803; Joseph Angelo Floria, Pennsville, N.J.

[73] Assignee: E. I. DuPont de Nemours and Company, Wilmington, Del.

[22] Filed: June 15, 1970

[21] Appl. No.: 46,550

Related U.S. Application Data

[63] Continuation-in-part of Ser. No. 803,560, March 3, 1969, abandoned.

[52] U.S. Cl. ............252/440, 252/455 R, 252/460, 252/466 PT, 252/477 R
[51] Int. Cl. .............................................B01j 11/06
[58] Field of Search ......252/477 R, 455 R, 440, 460, 252/466 PT

[56] References Cited

UNITED STATES PATENTS

| | | | |
|---|---|---|---|
| 3,383,159 | 5/1968 | Smith | 252/477 R |
| 2,431,143 | 11/1947 | Schutte | 252/477 R |
| 3,189,563 | 6/1965 | Hauel | 252/477 R |

FOREIGN PATENTS OR APPLICATIONS

| | | | |
|---|---|---|---|
| 1,526,150 | 4/1968 | France | 252/477 R |

*Primary Examiner*—Daniel E. Wyman
*Assistant Examiner*—W. J. Shine
*Attorney*—Lynn N. Fisher

[57] ABSTRACT

This invention relates to paper-like catalytic structures which are comprised of a catalytic material uniformly distributed throughout a porous fibrous support material. The paper-like catalytic structure can also include a cement or a filler material if desired.

This invention also relates to the process of preparing said paper-like catalytic structures.

4 Claims, 5 Drawing Figures

INVENTOR
ALVIN B. STILES

BY *Gerald A. Hapka*

ATTORNEY

PATENTED SEP 12 1972 3,691,097

SHEET 2 OF 2

INVENTOR
ALVIN B. STILES

BY  Herald A. Hapke

ATTORNEY

UNIFORM COMPOSITE STRUCTURES OF CATALYST AND FIBROUS REFRACTORY

CROSS-REFERENCE TO RELATED APPLICATIONS

This application is a continuation-in-part of my copending application Ser. No. 803,560, filed Mar. 3, 1969, now abandoned.

BACKGROUND OF THE INVENTION

This invention relates to paperlike catalytic structures and the process for making said structures. The typical composition of this invention can be generally classed as a paper, which term will be understood to describe a sheet material consisting of many small discrete fibers bonded together in which the components are uniformly distributed therein.

The catalytic structures of this invention are useful to absorb and oxidize solid, liquid or gaseous wastes. The catalytic structures of this invention are especially well adapted to be used in home cooking devices to absorb and burn out food residue wastes which result from normal cooking. The structures of this invention are also useful for eliminating oxidizable waste from other home and industrial operations.

As is well known, the difficulties experienced in cleaning cooking devices have led to the development of a pyrolytic self-cleaning oven. The pyrrolytic oven operates by burning out food residues at temperatures in the neighborhood of 800° to 900° F. This method thus has the disadvantage of requiring high temperatures for cleaning.

As described in U.S. Pat. No. 3,266,477, a method for cleaning cooking devices at lower temperatures by oxidation and without abrasion has been discovered. Thus at moderate temperatures of say 400° to 500° F. or even lower in some cases, cooking devices can be cleaned without overheating a kitchen or work area and without other attendant difficulties of high temperatures such as distortion of equipment and requirements for large amounts of insulation.

A particularly vexing problem in the operation of cooking devices is that of dealing with massive cooking spills. A massive cooking spill is understood as relating to a spill resulting from boiling over and the like, rather than the ordinary splattering that occurs during the cooking process. This invention is directed to a product that efficiently eliminates such unsightly massive spills. In addition, the paperlike, catalytic structures can be adapted to trap and oxidize solid waste materials such as lint, dust, sawdust, shavings and polymer dust from polymer fabricating operations.

Catalyst structures comprising catalytic materials supported on refractory fibers are known to the art. However, the catalytic structure of this invention exhibits superior handling and oxidation characteristics over art-known structures.

The art conventionally impregnates a catalyst into a wool-like, loosely packed, fibrous mat. In the process of this invention the catalytic material is incorporated in beater mix prior to its being formed into a relatively dense, blotter-paper like structure. This procedure results in numerous advantages over art-known mat catalytic structures.

In the catalyst structures of the invention, the pores are uniformly distributed throughout the entirety of the paper-like support material and the catalyst is likewise uniformly distributed throughout the blotter-like mat. The unit availability of the catalyst is greater than with the compositions known to the art. Furthermore, since the catalyst is not impregnated into a finished support material, but is a component of the beater mix, catalytic structures of greater porosity, structural strength, dimensional integrity, and absorbency than art-known structures can be prepared. Therefore, the incorporation of the catalyst in the beater mix has the advantage of providing a finished product which has the catalyst uniformly distributed throughout the structure, while obtaining a structure of high porosity which will allow diffusion of the oxidizable materials to take place readily throughout the entire catalytic structure.

DESCRIPTION OF THE INVENTION

This invention relates to formed paper-like structures which are useful in absorbing or otherwise trapping waste materials and oxidizing said materials at low temperatures but are also stable up to 1,000° F. or even above.

The structures are comprised of a non-combustible, fibrous support material and a catalytic material. In addition, the structures of this invention can also contain a cementing material and a filler.

Typical of the fibrous support materials employed in preparing the compositions of this invention are glass wool, rock wool, fibrous ceramic alumina, quartz fibers, refractory metallic filaments, zirconia fibers, sillimanite fibers and asbestos fibers.

The catalytic component of the compositions of this invention are those oxidizing agents effective at low temperatures but also stable up to temperatures of about 1,000° F. or even above. Such catalysts are known in the art for use in the complete oxidation of hydrocarbons, oils, greases, esters, organic acids, aldehydes, ketones and other organic materials.

The cement or binder component of the compositions of this invention are well known to the art and include materials such as calcium aluminate, magnesia cement, anhydrous calcium sulfate (plaster of Paris) portland cement, hydraulic cement and colloidal silica. Of the above calcium aluminate is the preferred cement.

It will also be understood that certain catalysts or their precursor salts can act as the cement in the compositions of this invention.

A filler material can also be employed to give body and rigidity to the catalytic structures of this invention resulting in a product having a higher degree of structural integrity than generally found in fibrous paperlike mats. The filler can be a non-fibrous material which may or may not be catalytic. Representative of the fillers that can be employed in the compositions of this invention are kieselguhr, diaspore, alumina, bauxite, aluminum hydroxide, magnesium hydroxide, magnesia, bentonite and montmorillonite. In some instances the filler can additionally act as the cement especially in the case of clays such as the bentonite or montmorillonite.

In addition to the above listed ingredients of the compositions of this invention, pigments can also be employed in the preparation of said compositions to improve the aesthetic properties of the finished product. In some instances the catalytic material employed will provide such pigmentation. For example, cobalt aluminate will lend a blue color to the finished product, nickel aluminate will lend a green color to the finished product and platinum metal will result in a white product when the other component parts of the finished product are selected to provide a white finished product.

The catalytic structures of this invention can be characterized as having a structural density of from 0.25 to 0.90 with compositions having a structural density of from 0.35 to 0.65 being preferred.

The term structural density refers to the weight of the formed structure in relation to the volume occupied by the composite excluding voids such as the holes in a honeycomb structure. The structural density can be calculated using the following formula:

$$\text{Structural density} = \frac{\text{Weight of the composition}}{\text{Volume occupied by the structure (excluding external voids)}}$$

The catalytic structures of this invention can be characterized as having a pore volume of 0.4 to 0.8 ml./gram with compositions having a pore volume of from 0.5 to 0.7 ml./gm. being preferred.

The term "pore volume" is defined as that weight (volume) of water absorbed during complete inflow of water into the catalytic structure, divided by the weight of the structure.

The catalytic structures of this invention are also characterized by a wide-spread pore distribution as would be expected in a paper-like composition. Generally, a majority of the pore volume is comprised of pores having their diameter within the range of from 2,000 A to 165,000 A. In addition, at least one percent of the pore volume will be comprised of pores of less than 400 A. Preferably the compositions of this invention will have from about 75–95 percent of the pore volume in the range of from 2,000 A to 165,000 A with at least 1 percent of the pores having a diameter of less than 400 A.

The diversity of pore size is indicative of the distribution of the pores necessary to obtain rapid diffusion, absorption, chemisorption and desorption throughout the catalyst structure.

As discussed above catalysts have heretofore been incorporated in non-combustible fiber supports, such as wool-like asbestos mats, by impregnation. The process of this invention departs from this procedure by incorporating the catalytic material in a paper beater mix prior to compression and drying into the paper-like structure.

Incorporating the catalyst into the beater mix enables some of the catalysts employed to bond with the surface of the fibrous support material as the result of natural attractive forces in a fluid system. Therefore, in addition to a product in which the catalyst is more uniformly distributed throughout the support material, better adhesion of the catalyst to the surface of the support fibers is achieved.

Impregnation of catalyst into a finished paper-like mat does not give a system in which the catalyst can uniformly and freely associate with the support material as occurs in the instant compositions. Impregnation also reduces the natural porosity of the support mat thereby decreasing the efficiency of the finished product to absorb and oxidize waste products. Furthermore, impregnation of an already formed fibrous structure causes warping, shrinking and deformation of the structure.

The catalytic structures of this invention can be prepared in the conventional manner for preparing non-catalytic papers.

Initially the fibrous support material is incorporated into a dispersion medium such as water or suitable organic solvent and a slurry is formed by mechanical agitation. The slurry thus formed will contain from 0.2 to 15 percent solids and preferably will contain from 2 to 8 percent solids. The dispersion medium can be water or an organic liquid such as methanol, acetone or carbon tetrachloride.

The dispersion medium chosen must be compatible with each of the various components of the finished product.

As stated above, the slurry, also called the beater-mix, is agitated until a homogeneous mixture is obtained. The beating time is controlled to insure that the fibrous support material becomes dispersed into its ultimate fibrils. For this purpose commercially available paper making machinery such as the hollander-type beater, jordan refiner, Claflin refiner, Hydrafiner and the like can be employed.

Catalytic material as well as the cement, fillers and other components are added to the beater mix near the end of the homogenization.

The catalytic material can be a catalyst per se, a catalyst precursor or a catalyst supported on an inert refractory such as alumina, alumina-silica, bauxite, pumice and the like. Such catalytic material will be added to the beater mix as a solid, in solution, or as a suspension. When added as a solid or as a suspension, the catalytic material will be in the form of finely divided particles, preferably of a size which will pass through a 325 mesh screen. There is actually no lower limit on the particle size of the solid catalytic material, but as a practical matter, the material will generally be larger than about 600 mesh since smaller particles are not readily obtained in substantial quantities by the ordinary methods of mechanical subdivision used in making catalysts.

The catalytic materials as noted above can be any of the solid inorganic compounds commonly used as oxidation catalysts. Thus there can be used the oxides, cerates, chromates, chromites, manganates, manganites, molybdates, tungstates and vanadates of such metals as iron, cobalt, nickel, palladium, platinum, ruthenium, rhodium, manganese, chromium, copper, molybdenum, tungsten, and the rare earths, including lanthanum, cerium, praseodymium, neodymium, promethium, samarium, europium, gadolinium, terbium, dysprosium, holmium, erbium, thullium, ytterbium, and lutetium, or their mixtures. The precious metals such as ruthenium, rhodium, palladium and platinum can of course also be used in the oxide or elemental form. Solid compounds of the catalytic metals which decompose upon heating to provide the oxides can of course also be used. These include the hydroxides, carbonates, nitrates, and organic salts of the various metals.

Preferred catalysts because of their comparatively high activity at low temperatures are ruthenium, palladium, and platinum metals and the oxides, cerates, manganates, or manganites, chromates or chromites or vanadates of cobalt, nickel, cerium, manganese, ruthenium, palladium, platinum and the rare earths. Also preferred are the mangano-chromia-manganite catalysts disclosed in Howk and Stiles U.S. Pat. No. 3,216,954.

The cement can include compounds such as calcium aluminate, magnesia cement, portland cement, hydraulic cement, anhydrous calcium sulfate, colloidal silica and the like. The catalyst itself or its precursor, such as the nitrate salts of the catalytic metals can be employed as the cement.

After the catalyst and other materials are added to the beater-mix, agitation is continued until a homogeneous mixture is obtained.

The homogeneous beater-mix can then be formed into a continuous sheet using standard papermaking equipment such as the cylinder machine or the Fourdrinier.

The catalytic mat formed as described above can be used as such in various applications or can be further treated by embossing, printing with appropriate designs or by formation into rigid structures, as desired.

The compositions of this invention when formed into rigid sheets are well suited for use in the bottom of household cook stoves to completely oxidize oils, greases and organic spillovers from normal cooking operations. The sheet, of course, should be thick and porous enough to absorb and distribute the spills while oxidation is taking place without blinding the catalytic material. Generally the formed catalytic sheets will be from 0.005 to 0.125 inch in thickness.

Such sheet compositions of this invention can be attached mechanically by means of adhesives or clamps to the walls, top, bottom or door of ovens to constitute an easily replaceable oxidation catalytic structure. Such a porous catalyst structure has the advantage over known structures of providing a catalytic structure in which the catalyst is uniformly distributed and further, which permits air diffusion from all directions and which minimizes the blinding of the catalyst when said structure is subjected to heavy soils resulting, for example, from food spills.

The finished paperlike catalytic structures of this invention will consist of about 0.01 to about 75 percent by weight of catalyst, from about 3 percent to about 50 percent by weight of non-combustible fibers as the support matrix, from 3 percent to about 50 percent by weight of cement and from 0 percent to 93.99 percent by weight of filler.

In FIG. 1 there is illustrated an artists representation of a typical paperlike catalytic structure of this invention comprised of non-combustible fibers 1, a cement material 2, catalyst particles 3 and 4 and a filler material 5.

Figure 2:
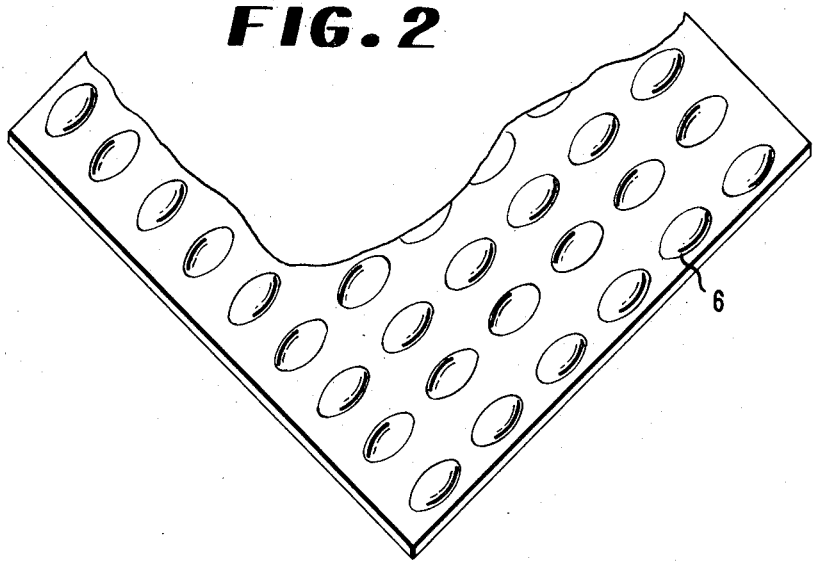

FIG. 2 is presented as an example of a mat that may be used in a home cooking oven to absorb and oxidize spills and other cooking wastes. Oval shaped indentations 6 are shown and serve to support the main body of the sheet so that air can readily circulate below the sheet.

Figure 3:
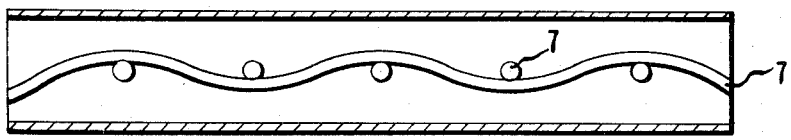

As indicated earlier the paperlike catalytic structures of this invention can be made rigid by forming said structures on a wire screen or by cross-weaving wire screen 7 into said catalytic structures. FIG. 3 illustrates cross-sectional view of screen supported catalytic structure of this invention.

Figure 4:
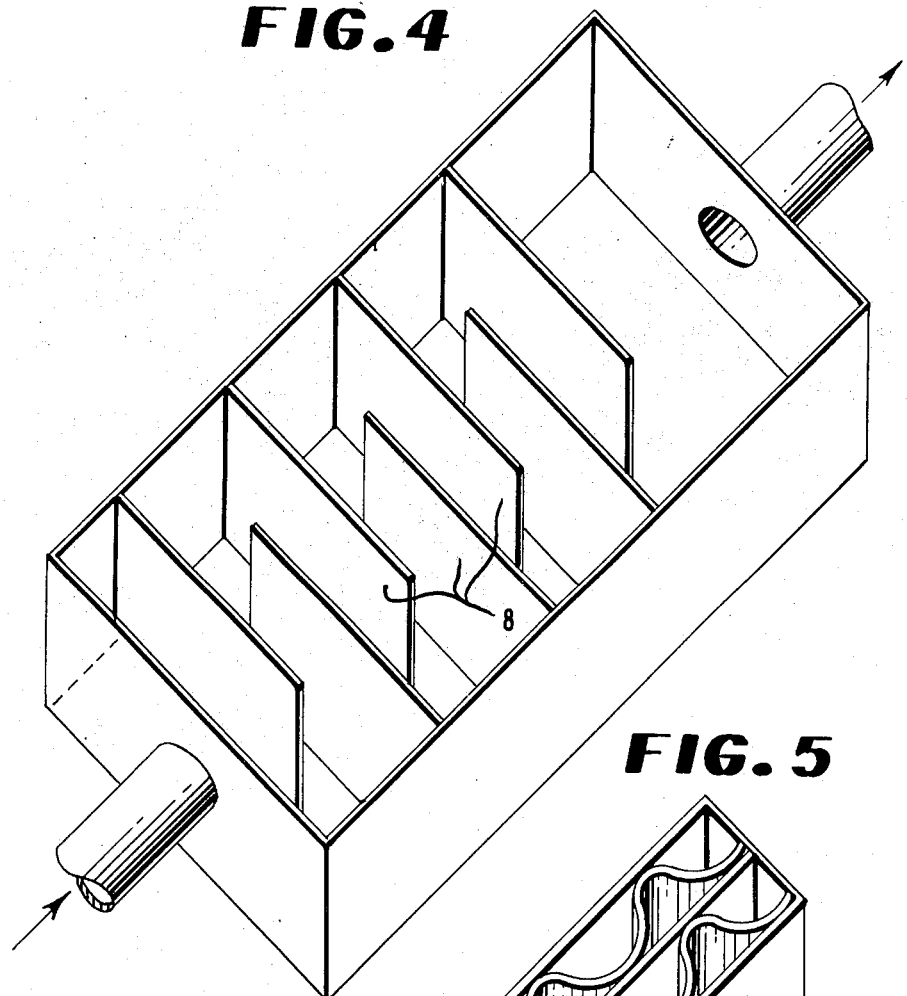
Figure 5:
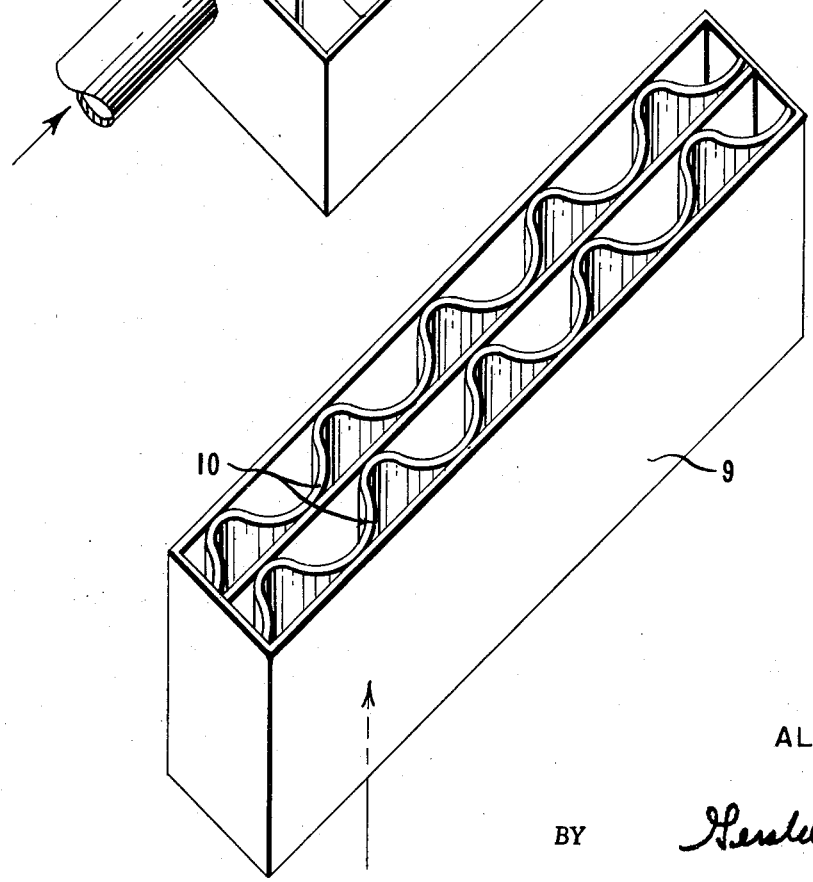

FIGS. 4 and 5 are presented to further illustrate applications for the catalytic structures of this invention. FIG. 4 is an illustration of a labrinthine path structure in which a gaseous product is passed through a box in which the catalyst sheets 8 are arranged to intercept continuously and retain briefly the flow of entry gas. The entry gas stream can be comprised entirely of a gaseous waste or could be comprised of a dust, lint or other such solid waste conveyed by a gas stream.

In case a solid waste such as lint from a home clothes dryer is to be eliminated, a heating element could be incorporated as an element in the baffle box or within the catalyst structure to maintain a sufficient temperature in the box to oxidize the lint after the dryer had completed its cycle. In this fashion an economic self-delinting dryer could be manufactured.

The strength of the paperlike structures of this invention can also be increased by forming said structure, as is known in the art of papermaking, into various configurations. FIG. 5 illustrates a corrugated catalytic structure. Such structures can be employed as low priced catalyst supports to replace ceramic or alumina catalyst supports. In an embodiment such as is illustrated in FIG. 5, if desired, the sheet comprising the outer wall 9 as well as the inner member 10 of the corrugated support can be sized with materials such as sodium or potassium silicate to produce a sheet having a hard finish and having reduced porosity. Such catalytic structures can also contain sizing materials that will more or less completely burn out at relatively low temperatures. These materials can be incorporated into the beater mix and can be used to increase the strength and rigidity to the paperlike structures during handling and shipment. The materials can then be oxidized out when the structures are installed. Suitable burn out materials include cotton fibers, starch, vinyl acetate, commercially available metallo-organic salts, animal protein and casein glue. The burn out materials should be carefully selected to insure that said material will not cause blinding of the catalyst when an attempt is made to burn it out.

This invention further relates to the application of paperlike fibrous catalytic structure on the interior surfaces of an oven cavity to produce an oven capable of oxidizing at normal operating temperatures, waste material generated during use.

It will be understood that conventionally impregnated catalytic mats can be applied to interior oven surfaces as well as the catalytic structures hereinbefore described. The useful catalytic materials will be the same as with those used for the catalytic mats of the invention. These catalytic mats are made by impregnating the preformed fibrous mat with the catalytic materials by techniques well known in the art.

It will be understood that the term "oven" as employed herein is used in its generic sense to identify a chamber which is heated by a heating means and employed for baking, heating or drying. Specifically, this term is intended to include home cooking ovens, commercial cooking ovens, paint drying ovens and the like.

The paperlike, fibrous catalytic structures can be applied to the interior surfaces of the oven by any suitable fastening means. It will be understood that the fastening means include devices such as screws, snaps, clips and the like; or a heat stable adhesive material such as potassium, lithium or sodium silicate, ethyl silicate, guanidine silicate, colloidal silica, aluminum hydroxide gel and magnesium hydroxide gel. It will be understood that the adhesive is not intended to be limited to those enumerated above and that any adhesive material suitable for bonding the paperlike fibrous catalytic structure to the interior oven surfaces which is stable within the normal temperature range of the oven can be employed.

It will be understood that the adhesive material can be applied to the interior surfaces of the oven and the catalytic structure can then be applied. Alternatively the adhesive material can be applied to the catalytic structure or to both the oven surface to be altered and the catalytic structure as desired.

The following Examples are presented to further illustrate the products and processes of this invention.

EXAMPLE 1

1. A catalyst is prepared by slurrying 500 parts by weight of finely divided mixed rare earth carbonates (an example of a suitable mixture of rare earth carbonates consists of the following:

| | |
|---|---|
| cerium carbonate | 43% |
| praseodymium carbonate | 5% |
| samarium carbonate | 5% |
| europium carbonate | 5% |
| gadolinium carbonate | 3% |
| terbium carbonate | 1% |
| dysprosium carbonate | 2% |
| holmium carbonate | 2% |
| erbium carbonate | 6% |
| thulium carbonate | 3% |
| ytterbium carbonate | 4% |
| lutetium carbonate | 4% |
| lanthanum carbonate | 17% ) | in 4,000 parts by weight of distilled water; 100 parts by weight of nickel nitrate, 100 parts by weight of cobalt nitrate hexahydrate, and 100 parts by weight of a 50 percent solution of manganese nitrate are all added to the previously prepared slurry and dissolved. The slurry with dissolved salts is heated to 70° C. and ammonium carbonate is added in sufficient quantity to bring the pH to a value of 6.8. Agitation of the slurry is continued for 60 min. after the correct pH has been reached. Thereafter the precipitate is filtered, washed with distilled water to remove the nitrate ion, then the precipitate is dried and calcined at 400° C. for 2 hours. The catalyst thus produced is used in the ensuing instructions of this example.

2. A paper beater mix is prepared by mixing 3 parts by weight of asbestos fibers, 0.5 parts by weight of fine denier glass fibers chopped into ⅛ inch to ⅜ inch lengths, 10 parts by weight of the catalyst prepared in Item 1 above, 2.5 parts by weight of finely divided calcium aluminate cement and 10 parts by weight of kieselguhr which has been specially treated to remove iron and to produce a white product having particle sizes in the range 200–400 mesh, together with 300 parts by weight of distilled water.

3. The beater mix of Item 2 is slowly beaten to incorporate all ingredients thoroughly with each other for a period of 30 minutes.

4. The fibrous slurry produced in Item 3 is placed on a filter screen uniformly so as to produce a uniform sheet.

5. The filter cake in the form of a sheet is compressed to produce a sheet having smooth surfaces on both sides.

6. The paper sheet produced in Item 5 is dried and is in a form suitable for catalytic operations. It has a pore volume of 0.54 ml./gram and a density of 0.58 g./ml. A second similar lot was prepared increasing the compression pressure and the pore volume was 0.41 ml./gram and density was 0.88 g./ml.

The sheet can be cut and fitted into a catalytic converter in the form of baffles within that converter as shown in FIG. 4 of the drawings. In this converter, the catalyst is useful for oxidation reactions such as the complete oxidation and disposal of noxious fumes from baking or processing operations for foods, printing, industrial operations such as painting or petroleum processing or engine exhausts.

Instead of the sheets being used as flat surfaces, they can be embossed to produce alternate bumps or depressions or they can be corrugated and assembled as corrugated structures. These are shown in FIGS. 2 and 5 as assembled composite catalytic structures. Such structures can also be used in the bottom or inside of domestic cookstoves for the oxidation of food spatterings which results from the cooking of food in the oven.

If it is desired to use the sheets whether they are embossed or in flat sections in domestic cookstoves or other places where the aesthetics are important, the sheets can be colored by methods known in the art by the incorporation of suitable pigmentation in the paper beater mix. Such colors must be temperature resistant and are of the type designated ceramic pigments and are an article of commerce.

It is possible also to print designs on the surface of the sheets in such a way as to present a simulated brick, marbleized or other artistic design to improve the aesthetics. Of course, such printing inks must be made from temperature resistant pigments.

EXAMPLE 2

1. A beater mix is prepared incorporating 10 parts by weight of mixed rare earth carbonates of the type called for in Item 1, Example 1. Also added to the mix are two parts by weight of asbestos fibers, 0.1 part by weight of "Fiberfrax" fibers in the form of ⅛ inch to ⅜ inch strands, 2.0 parts by weight of calcium aluminate, 8 parts by weight of diatomaceous earth, 300 parts by weight of water, 2.0 parts by weight of ammonium bicarbonate, and 5.0 parts by weight of hydrazine hydrate.

2. The above components are lightly beaten together for 30 minutes until a thoroughly uniform fibrous slurry is produced.

3. After the 30-minute period a 1 percent solution of chloroplatinic acid in sufficient volume to be equal to 0.5 parts by weight of platinum is next added to the beater mix very rapidly (less than 10 sec.). The agitation is continued for an additional 10 minutes to assure that the platinum is uniformly precipitated on the components of the beater mix.

4. The slurry thus produced is processed according the the instructions given in Example 1. Nos. 4–6. The sheet had a pore volume of 0.68 ml./gram and a density of 0.53 g./ml.

The sheets and structures thus produced are essentially white and their aesthetics are superior to the gray composition produced in Example 1. This composition is most receptive to printing, color incorporation and the obtaining of pleasing aesthetics effects. Consequently, it is most desirable for use where the aesthetics is important such as in domestic cookstoves: for oven interiors or for fume and smoke abatement from the oven or the burners normally used for saucepans and frying pans.

Instead of the rare earths specified above, the amount of diatomaceous earth can be increased and the rare earths decreased equivalently. Furthermore instead of platinum, iridium, palladium, rhodium or ruthenium or their mixtures can be used.

Instead of the diatomaceous earth there can be used alumina, alumina hydrate, bentonite clays and similar clays, powdered pumice, powdered limestone or other white refractory, water insoluble particulate filler.

EXAMPLE 3

1. 10 parts by weight of finely divided alumina (100 percent through 325 mesh) coated with 0.1 percent platinum, 10 parts by weight of "Fiberfrax" in the form of chopped fibers (⅛ inch to ¼ inch long) and 10 parts by weight of finely divided magnesium hydroxide together with 10 parts by weight of diatomaceous earth were slurried as a paper beater mix with 400 parts by weight of distilled water.

2. After 30 minutes of agitation the uniform slurry was divided into two portions, one-half of which was placed on a typical paper making screen as a thin coating.

3. A stainless steel screen fabricated in the form of 8 mesh screen and 10 ml. diameter wire was placed immediately over the previously formed sheet. Thereafter the remaining slurry was poured over the screen and previously formed catalytic sheet.

4. The composite structure consisting of a sandwich with the wire screen between two layers of catalytic sheet was now pressed to form a sheet with the wire screen as the reinforcing center with the catalytic sheets on each side as shown in FIG. 3.

5. The composite structure was then dried and became a catalyst structure suitable for catalytic operations. Because of the wire reinforcement, the pore volume and density measurements were impractical.

The sheet was cut in the form of panels 4 inches × 6 inches which were placed as baffles in a housing 4 inches wide × 8 inches high and 24 inches long. The sheets were placed in such a way that they were alternately against one side and the other as shown in FIG. 4 in the drawings. The catalyst chamber with the catalytic baffles was useful for exhaust streams from automobile engines, diesel engines and other systems where abatement of fumes was necessary and could be accomplished by oxidation of the fumes.

Instead of the 10 parts of "Fiberfrax" called for in Item 1 of this example, there can be used as small an amount as only 1 part of "Fiberfrax" fibers of the same description as previously given. Furthermore, instead of "Fiberfrax" fibers, there can be used glass wool or rock wool fibers as necessary. "Fiberfrax" is a trade name for aluminum oxide fibers produced commercially.

Instead of the type and size of wire described, there can be used other types of wires either of catalytic or non-catalytic capabilities and of a size and mesh type which would be acceptable as long as it would be compatible with the type of noncombustible paper being applied thereto. For example, silver screen, precious metals screens of other types as well as ordinary iron, nickel or cobalt screens would be acceptable.

Instead of the wire screen as described above, there can be substituted other types of filaments or fabrics such as woven glass, high temperature resistant polytetrafluoroethylene, polyimide, or polyamide fabrics. The ceramic or organic fabrics would be selected for uses under specific temperature conditions. For example at low temperature ranges organic or haloorganics could be used whereas the ceramic material would be used at temperatures in excess of 300° C. The sheets derived from organic or haloorganic materials should be operated at temperatures below the melting point of the reinforcing plastic.

Catalyst composites in the sheet form produced with wire or other filament reinforcing are particularly useful for the preparation of catalyst structures in the form of bag filters which not only filter the solid particulate combustible matter from gases but also effect its oxidation on contact with the catalytic, porous fabric when the appropriate oxidation and temperature environment are provided.

The sheets derived from the catalytic slurry with the metallic wire insert are particularly useful for fuel cell applications for either the positive or negative electrode when coated either with finely divided silver or platinum group metals depending upon which electrode is to be prepared.

EXAMPLE 4

1. A catalyst is prepared according to Example 1 of U.S. Pat. No. 3,216,954 through Item 7 of this example. This preparation and catalyst is a mangano-chrome manganite composition.

2. 10 parts of a catalyst produced in Item 1 above together with 10 parts by weight of silica as 30 percent "Ludox" SM plus 20 parts of fine denier glass fibers plus 10 parts of bentonite clay were slowly mixed together to produce a slurry with 300 parts by weight of water. Also added to the composite to increase the stiffness of the finished sheet was 5 parts by weight of cornstarch.

3. After agitating for 30 minutes the slurry was uniformly drawn from the beater mix and formed into a sheet which eventually was processed as described in Example 1 to produce a paper having a thickness of 0.06 inches. The finished sheet was more resistant to breakage because of the starch component and as a consequence could be more readily handled before installation in catalytic service. The starch was removed by the heating operation which accompanied or preceded the use of the catalyst for its oxidation purposes. After removal of the starch, the sheet had a pore volume of 0.73 ml./gram and a density of 0.29 g./ml.

Instead of the starch specified in Item 2 above, rosin, animal glue, polyethylene fluff or vinyl acetate as examples could be used as a temporary stiffening or hardening agent which would be burned out prior to the catalyst being put into service.

Instead of the organic stiffening materials specified in the preceding paragraph, there can be used a solution of individual or mixed catalytic nitrates such as cobalt, nickel, copper, manganese or other catalytic metal which are occluded in the paper and are calcined during the normal heating of the catalyst sheet and on calcining leave a deposit of catalytic oxide uniformly through the catalyst structure amounting to 0.1 to 5 percent.

Instead of the mangano-chrome manganite as stipulated in Item 1 above, there can be employed a similar quantity in Item 2 above of finely divided oxide of copper, zinc, manganese, nickel, cobalt, chromium, vanadium, molybdenum, tungsten, rare earths, silver or precious metals or their mixtures or reaction products such as vanadates, manganates, chromates, chromites, molybdates, tungstates in equal, lesser or larger quantities as desired to achieve the proper catalytic performance. Furthermore, wire screen could be inserted which could be sandwiched as called for in Example 3 also in the product of Example 4. If the metal wire is "Nichrome," electric current can be passed through the wire to heat the catalytic composite structure to oxidation temperature. This is an attractive way of heating the catalyst to oxidation temperature cyclically without heating large quantities of gas or liquid from which combustible solids or liquids are filtered or absorbed.

Instead of the colloidal silica stipulated in Item 2 above, one can use other cements such as calcium aluminate, magnesia cement, portland cement, anhydrous calcium sulfate (plaster of Paris) or hydraulic cement.

EXAMPLE 5

1. 10 parts by weight of a ⅓ × ⅓ × ⅓ stoichiometric mixture of cobalt oxide, manganese oxide and cerium oxide is prepared as a finely divided powder passing 100 percent through a 325 mesh screen. This mixed oxide plus 10 parts by weight of fine denier silica fibers as ¼ inch chopped fibers and 1 part by weight of colloidal alumina are slurried together with 400 parts by weight of water to form a beater mix.

2. After 25 minutes of agitation in the beater, the uniform slurry was processed through a typical papermaking machine on the filter screen of which was placed a sheet of woven net with ⅛ inch openings and fabricated from silica fibers. This was processed in such a way as to produce a sheet with the woven net of silica fibers as a reinforcing member.

3. The sheet thus produced was dried and then one-half was further calcined at 800° C. to cause a coalescing and strengthening of the fiber composite.

4. The sheet was divided into 4 inches wide × 18 inches long strips and were each coated on one side with sodium silicate solution.

5. The strips were then applied directly to the walls of a domestic cookstove oven and were allowed to dry thereon. One wall was coated with the sheet which had been simply dried at 150° C., whereas another wall was coated with the more rigid sheet which had been heated to 800° C.

6. The walls thus derived were especially effective for the removal by oxidation of soils splattered onto them during the cooking of meats or other edible baked goods. Furthermore, when this same type sheet was applied to the bottom of the oven, very rapid cleanup of even heavy spills was obtained at normal cooking temperatures.

Instead of the sodium silicate being used as the adhesive, ethyl silicate, guanidine silicate, potassium silicate, colloidal silica, colloidal alumina or other adhesive could be used to give equally good adhesion and oxidation characteristics for the catalytic coating.

The same type catalytic sheeting was applied to the exit duct from a paint spraying chamber and enamel baking facility. The volatile products from the pain and enamel finishing were oxidized and essentially completely removed as the effluent passed through the discharge duct lined with the catalytic coating.

When the oven walls in the industrial baking oven were also lined with the catalytic sheeting, spattered paint and enamel as well as the volatile combustible components were oxidized so that only an ash residue remained on the catalytic walls.

Instead of the silica fibers specified in Item 1 above, there can be used asbestos fibers, potassium titanate fibers, mullite fibers, glass fibers or even rock wool fibers.

EXAMPLE 6

1. A woven asbestos cloth having a twill weave and a thickness of approximately 1/16 inch was impregnated as a 24 inch × 24 inch sheet by immersing in an aqueous solution comprising 5 percent nickel nitrate hexahydrate, 5 percent manganese nitrate hexahydrate and 5 percent chromium nitrate nonahydrate.

2. The wet asbestos sheeting was dried and then calcined to deposit a mixture of finely divided nickel, manganese and chromium oxides.

3. The sheet was cut into suitably sized strips and each strip was coated on one side with a solution of ethyl silicate.

4. While still moist the sheet was applied to a domestic oven wall and Items 1-3 were repeated until all walls, back, front and bottom, of the oven had been completely coated.

5. The coating thus produced provided an effective catalytic surface to oxidize soils derived during cooking.

Similarly applied walls on industrial ovens such as those used to bake asphalt impregnated asbestos or ceramic fibers were thus converted to surfaces which would oxidize odorous combustible products from the drying and baking operation. When such ovens are used also for baking plastic articles, a similar abatement of fumes and odorous materials is achieved. As was the case in Example 5, linings of the exhaust ducts and hoods similarly improved the efficiency of fume abatement.

Instead of the asbestos cloth specified in Item 1, there can be used other woven fabrics such as spun bonded or woven glass fabrics, silica fabrics, carbofrax fabrics or even "Teflon" or other organic or halo-organic fabrics if the temperature is not excessive to cause melting or heat deterioration.

Instead of the catalytic materials specified in Item 2 above, there can be used other catalytic materials known in the art and instead of using the catalytic materials as the nitrate, other salts such as acetate, oxalate, carbonate, aminonitrate, aminocarbonate can also be used. In some cases an especially effective catalyst can be made from the alkaline chromate or the soluble chromate salts of copper, nickel, cobalt, for example.

If desired to obtain a more abrasion resistant coating, the sheet can be calcined at sufficiently high temperature as specified in Example 5 to achieve a desired amount of interweaving and coalescing of the fibers to produce a strengthened bonding because of the "-welding" of the fibers at their juncture.

What is claimed is:

1. A process for preparing a catalytic structure of an oxidation catalyst supported on a non-combustible fibrous support material in which said catalyst is uniformly distributed throughout the structure, said structure having a structural density of from 0.25 to 0.90 and a pore volume of 0.4 to 0.8 ml. per gram, and the catalyst being at least one member selected from the group consisting of (a) elemental ruthenium, rhodium, palladium, and platinum, (b) the oxides, cerates, chromates, chromites, manganates, manganites, tungstates, molybdates and vanadates of iron, cobalt, nickel, palladium, platinum, ruthenium, rhodium, manganese, chromium, copper, molybdenum, tungsten, and the rare earths and (c) mixtures thereof, comprising the steps of
   a. preparing a slurry of a fibrous support material in a liquid medium selected from the group consisting of water or a suitable organic liquid;
   b. beating said slurry until the fibrous support material is uniformly dispersed throughout the beater-mix as the ultimate fibrils thereof;
   c. adding a catalytic amount of an oxidation catalyst or a precursor thereof to said beater-mix;
   d. optionally adding a cement or a filler material to said beater-mix;
   e. beating the mixture until a homogeneous slurry is attained; and
   f. removing said liquid medium to form a paperlike catalytic structure.

2. The process of claim 1 wherein the fibrous support material is selected from the group consisting of glass wool, rock wook, fibrous ceramic alumina, quartz fibers, refractory metallic filaments, zirconia fibers, sillimanite fibers or asbestos fibers.

3. The process of claim 1 wherein the cement is selected from the group consisting of calcium aluminate, magnesia cement, portland cement, anhydrous calcium sulfate, hydraulic cement and collodial silica.

4. The process of claim 1 wherein the filler is selected from the group consisting of kieselguhr, diaspore, alumina, bauxite, aluminum hydroxide, magnesium hydroxide, bentonite and montmorillonite.

* * * * *